United States Patent [19]

Moser et al.

[11] Patent Number: 5,246,677

[45] Date of Patent: Sep. 21, 1993

[54] ADDITION OF ORGANOPHOSPHONATES FOR SIZE CONTROL OF WET CALCIUM-BASED FGD BYPRODUCT SOLIDS UNDER FORCED OXIDATION CONDITIONS

[75] Inventors: Robert E. Moser, Palo Alto, Calif.; Frank B. Meserole; Gordon Maller, both of Austin, Tex.

[73] Assignee: Electric Power Research Institute, Palo Alto, Calif.

[21] Appl. No.: 696,768

[22] Filed: May 7, 1991

[51] Int. Cl.$^5$ .................... C01B 17/00; C01B 17/20; C01B 17/22
[52] U.S. Cl. ............... 423/243.08; 423/242.2; 423/242.3; 423/242.7; 423/555
[58] Field of Search ............... 423/242 A, 243, 555, 423/242 R, 242.2, 242.7, 242.3, 243.08, 243.09

[56] References Cited

U.S. PATENT DOCUMENTS

| | | | |
|---|---|---|---|
| 3,708,226 | 1/1973 | Gustavsson | 423/242 |
| 4,342,733 | 8/1982 | Steelhammer et al. | 423/242 |
| 4,503,020 | 3/1985 | Weissert et al. | 423/242 |
| 4,515,754 | 5/1985 | Stehning | 423/242 |
| 4,687,649 | 8/1987 | Kuroda et al. | |
| 4,810,477 | 3/1989 | Shinoda et al. | |
| 4,818,506 | 4/1989 | Lin et al. | 423/242 |
| 4,832,936 | 5/1989 | Holter et al. | |

FOREIGN PATENT DOCUMENTS 2916975 10/1979 Fed. Rep. of Germany ...... 423/242

Primary Examiner—Gregory A. Heller
Attorney, Agent, or Firm—Sixbey, Friedman, Leedom & Ferguson

[57] ABSTRACT

A process for producing large, regularly-shaped crystalline gypsum solids in a wet calcium-based flue gas desulfurization system is provided. A chemical crystal modifier, preferably an organophosphonate, is added to the gypsum-containing solids slurry produced by the FGD process under forced oxidation conditions at an addition level which promotes the formation of large, regular gypsum crystals that are easily dewatered. The dewatered gypsum is useful in producing gypsum-based building products and the like.

10 Claims, 10 Drawing Sheets (100 X)

(250 X)

(500 X)

(100 X)

(250 X)

(500 X)

(100 X)

(250 X)

(500 X)

BASE CASE TEST (100 X)

10 PPM PPA TEST (100 X)

10 PPM ATMP TEST (50X)

10 PPM HEDP TEST (100X)

10 PPM DTDMP TEST (100 X)

10 PPM HTMP TEST (100 X)

ADDITION OF ORGANOPHOSPHONATES FOR SIZE CONTROL OF WET CALCIUM-BASED FGD BYPRODUCT SOLIDS UNDER FORCED OXIDATION CONDITIONS

TECHNICAL FIELD

The present invention relates generally to the control of wet calcium-based flue gas desulfurization (FGD) processes and specifically to a method of producing an improved gypsum solids byproduct by controlling the formation of the gypsum crystals during the FGD process.

BACKGROUND ART

Flue gas desulfurization (FGD) processes currently in use today typically employ wet calcium-based technology to remove sulfur from various flue gas sources Sulfur is absorbed from the flue gas as $SO_2$ into a calcium-containing liquid phase and forms calcium sulfite or calcium bisulfite. At least some of calcium sulfite or bisulfite will be oxidized to calcium sulfate. The amount of calcium sulfate oxidized will depend, in large measure, on the amount of excess oxygen in the flue gas. Crystals of calcium sulfite or calcium sulfate, primarily as gypsum ($CaSO_4.2H_2O$), will form as the respective critical relative saturations for each of the compounds is exceeded in the liquid phase. If the ratio of the amount of sulfite oxidized to sulfate compared to the total amount of sulfur compounds absorbed from the flue gas is less than 15 to 18%, all of the sulfur will be purged from the FGD system as a coprecipitate within the calcium sulfite crystal matrix. If this occurs, the calcium sulfate or gypsum relative saturation in the liquid phase will never exceed 1.0, and, therefore, calcium sulfate or gypsum scaling cannot occur.

The widespread use of calcium-based wet scrubbers for controlling $SO_2$ emissions from utility boilers and the like generates as waste quantities of calcium sulfate and/or calcium sulfite solids in the range of 5 to 10 million tons annually in the United States. This material is currently disposed of primarily in ponds and landfills. The volume of this FGD waste material and the disposal methods currently employed depends largely on the chemical composition of the precipitated solids. Calcium sulfate dihydrate (gypsum) solids are generally larger and more regularly shaped than are calcium sulfite hemihydrate solids. While gypsum can usually be dewatered to produce about 85% solids, only about 50 to 70% calcium sulfite hemihydrate solids can typically be produced. Moreover, the calcium sulfite sludges tend to exhibit thixotropic-like behavior, which increases the difficulty and expense of their disposal.

The size and shape of gypsum crystals produced in the wet calcium-based FGD processes can affect the dewatering and handling characteristics of the resulting waste product. The performance of the dewatering equipment can be affected significantly by the size and shape of these gypsum crystals. If the gypsum particles are smaller than about 5 microns, they will impede filtration by blinding the filter media or forming a fine film on the solids being filtered, thus reducing the filtration rate and increasing the amount of moisture retained by the gypsum. Additionally, if the gypsum produced by FGD processes is to be a useful product, the ability to control the particle size, moisture content and impurity level is critical.

The use of FGD process-generated gypsum has been proposed for gypsum-based building materials such as wallboard. However, the inconsistent chemical purity and the lack of control of gypsum crystal size characteristic of gypsum byproducts of currently used FGD processes has often resulted in an inferior product. Impurities such as chloride in the gypsum result from adherent scrubber solution, and the amount of these impurities in the byproduct is directly related to solution composition and the degree of dewatering.

The gypsum disposal and use problems could be reduced by modifying available FGD processes to produce larger crystals. FGD process sludges could be dewatered more easily and with greater efficiency to produce a product with potential commercial utility if the size and shape of the crystals and particles were larger and more regular In addition, new systems could be designed with smaller and less expensive dewatering and disposal equipment.

The prior art has proposed solutions to the gypsum scaling problem in flue gas desulfurization systems. In these cases, additives have been used to prevent gypsum precipitation rather than modify the size and shape of the precipitated crystals. For example, U.S. Pat. No. 4,818,506 to Lin et al. discloses compounds, including organo-phosphonates, useful as gypsum scale inhibitors in flue gas desulfurization processes. These compounds affect the liquid phase chemistry to permit the toleration of a higher gypsum relative saturation without the occurrence of gypsum precipitation or scaling. The compounds disclosed by Lin et al. inhibit the formation of gypsum crystals until a higher liquid phase gypsum relative saturation exists. If the natural oxidation is not high enough, the higher liquid phase gypsum relative saturation may never be reached, and scaling will not occur. The solids produced by the system described by Lin et al. are a mixture of calcium sulfite and calcium sulfate mixed crystals. Increasing the size and regularity of the crystals is not suggested Moreover, the Lin et al. system specifically minimizes crystal growth. As a result, disposal of the Lin et al. byproduct solids remains a problem, and the reuse potential of these solids is extremely limited U.S. Pat. Nos. 4,503,020 to Weissert et al.; 4,687,649 to Kuroda et al.; 4,810,477 to Shinoda et al. and 4,832,936 to Holter et al. all describe flue gas desulfurization processes which produce gypsum. Of these processes, only that described in U.S. Pat. No. 4,503,020 specifically discloses a method for producing gypsum crystals with a particle size large enough to render the gypsum useful for the production of gypsum building materials such as plasterboard. This method processes the flue gas scrubber sump product with a thickener and circulates it for a rather lengthy period of time at a controlled temperature to produce calcium sulfate dihydrate (gypsum) in large crystal form. The crystals are dewatered and treated with sulfuric acid and steam to convert them to the alpha hemihydrate, which is free from sulfite. Although this method may be used to produce large crystals of gypsum, it provides no control over the size and shape of the crystals and, thus, the quality of the gypsum product. None of the other patents, moreover, suggests controlling FGD processes to control the production of gypsum crystals so that they have a size and shape that renders them useful for building materials or other gypsum products.

The prior art, therefore, has failed to provide a method of treating wet calcium-based flue gas desulfurization process byproduct solids which controls the size and shape of the gypsum crystals in these solids to permit the production of a commercially useful gypsum product. A need exists, therefore, for a method of treating wet calcium-based FGD byproduct solids under forced oxidation conditions which permits control of the size and shape of the crystalline solids.

SUMMARY OF THE INVENTION

It is a primary object of the present invention, therefore, to overcome the disadvantages of the prior art and to provide a method for controlling the size and shape of gypsum crystals formed under forced oxidation conditions in a wet calcium-based flue gas desulfurization system.

It is another object of the present invention to provide a method for modifying the precipitation and growth characteristics of gypsum in a wet calcium-based flue gas desulfurization process.

It is a further object of the present invention to provide a method for producing gypsum byproduct solids from a wet calcium-based FGD process under forced oxidation conditions which are more easily dewatered.

It is yet another object of the present invention to provide a method for treating FGD byproduct solids which substantially reduces the production of gypsum particles with a size of less than 5 microns.

It is yet another object of the present invention to provide an additive for treating FGD byproduct solids which enhances the size and shape of gypsum crystals instead of inhibiting gypsum crystal precipitation.

It is still another object of the present invention to produce a commercially useful gypsum byproduct from a wet calcium-based flue gas desulfurization process conducted under forced oxidation conditions.

The aforesaid objects are achieved by providing a wet calcium-based flue gas desulfurization system which employs a chemical crystal habit modifier to improve the quality of the gypsum crystals in the FGD byproduct solids under forced oxidation conditions, thus enabling the production of a commercially useful gypsum product. The present invention provides a method for producing large, regular gypsum crystals that are easily dewatered in a wet, calcium-based flue gas desulfurization system operated under oxidation conditions favoring the formation of calcium sulfate dihydrate solids in the system. An amount of a chemical crystal modifier is added to the system to cause the formation of substantially regularly shaped, large gypsum crystals. A slurry of FGD byproduct solids is held under forced oxidation conditions, while stable operating pH, temperature, slurry solids concentration, liquid-to-gas ratio and additive concentration are maintained. A chemical crystal habit modifier, which may be selected from the group consisting of organophosphonates, polyphosphates and organic phosphates, is added to the slurry at a level of less than 200 ppm. Preferred crystal habit modifiers are organophosphonates and polyphosphates. The preferred organophosphonates are aminotri (methylene phosphonic acid) (ATMP), hydroxyethylidene-1,1-diphosphonic acid (HEDP), hexamethylenediamine tetra(methylene phosphonic acid) (HTMP) and diethylenetriamine penta(methylene phosphonic acid) (DTPMP) and the preferred polyphosphate is polyphosphoric acid (PPA). An especially preferred crystal habit modifier is ATMP added at a level of about 20 ppm, which effectively increases the size, thickness and settling properties of gypsum crystals in a forced oxidation environment.

Other objects and advantages will be apparent from the following description, drawings and claims.

DESCRIPTION OF THE PREFERRED EMBODIMENTS

Flue gas desulfurization (FGD) processes which employ wet calcium-based technology produce gypsum solids under forced oxidization conditions. This byproduct can be a waste substance which requires relatively expensive disposal methods because of the large volumes that are typically produced. However, if the FGD processing conditions are adjusted to favor the formation of large gypsum crystals, a commercially useful product can be produced. The present invention is directed to the use of chemical crystal habit modifiers under forced oxidation conditions to modify the precipitation and growth characteristics of gypsum byproduct solids in a wet calcium-based FGD system. The gypsum crystals produced according to the present invention are larger, thicker and more uniform in size than they would otherwise be in untreated FGD byproduct solids. The crystal habit modifier-treated FGD byproduct solids produced according to the present invention also exhibit improved settling and dewatering properties.

Because the size and shape of gypsum crystals produced in a wet calcium-based FGD system have a significant effect on the characteristics of the gypsum solids ultimately produced by this system, the control of crystal size and shape is essential to the production of usable FGD byproducts which do not require disposal as waste. Additionally, the ability to control crystal size and shape in accordance with the present invention permits the optimization or elimination of dewatering and other processing equipment. The method described herein forms large, thick, substantially uniformly sized gypsum crystals that significantly exceed 200 microns. The typical average size for gypsum particles produced in wet scrubbers ranges from 50 to 200 microns. Small gypsum particles less than 5 microns in size can have significant adverse effects on the dewatering of gypsum byproducts produced by FGD processes. These very small particles impede filtration by blinding the filter media or by forming a fine film on the filter cake that both reduces the filtration rate and increases the amount of moisture retained by the gypsum byproduct solids. Consequently, the large crystal gypsum byproduct produced by the present invention avoids these problems and is easily dewatered to produce a high solids content product.

Applicants' copending U.S. patent application Ser. No. 696,767, filed May 7, 1991 entitled "Addition of Organophosphonates for Size Control of Wet Calcium-Based FGD Byproduct Solids Under Inhibited Oxidation Conditions" describes the production of calcium sulfite crystals of large size and substantially regular shape. The disclosure of this application is hereby incorporated herein by reference.

Figure 1:
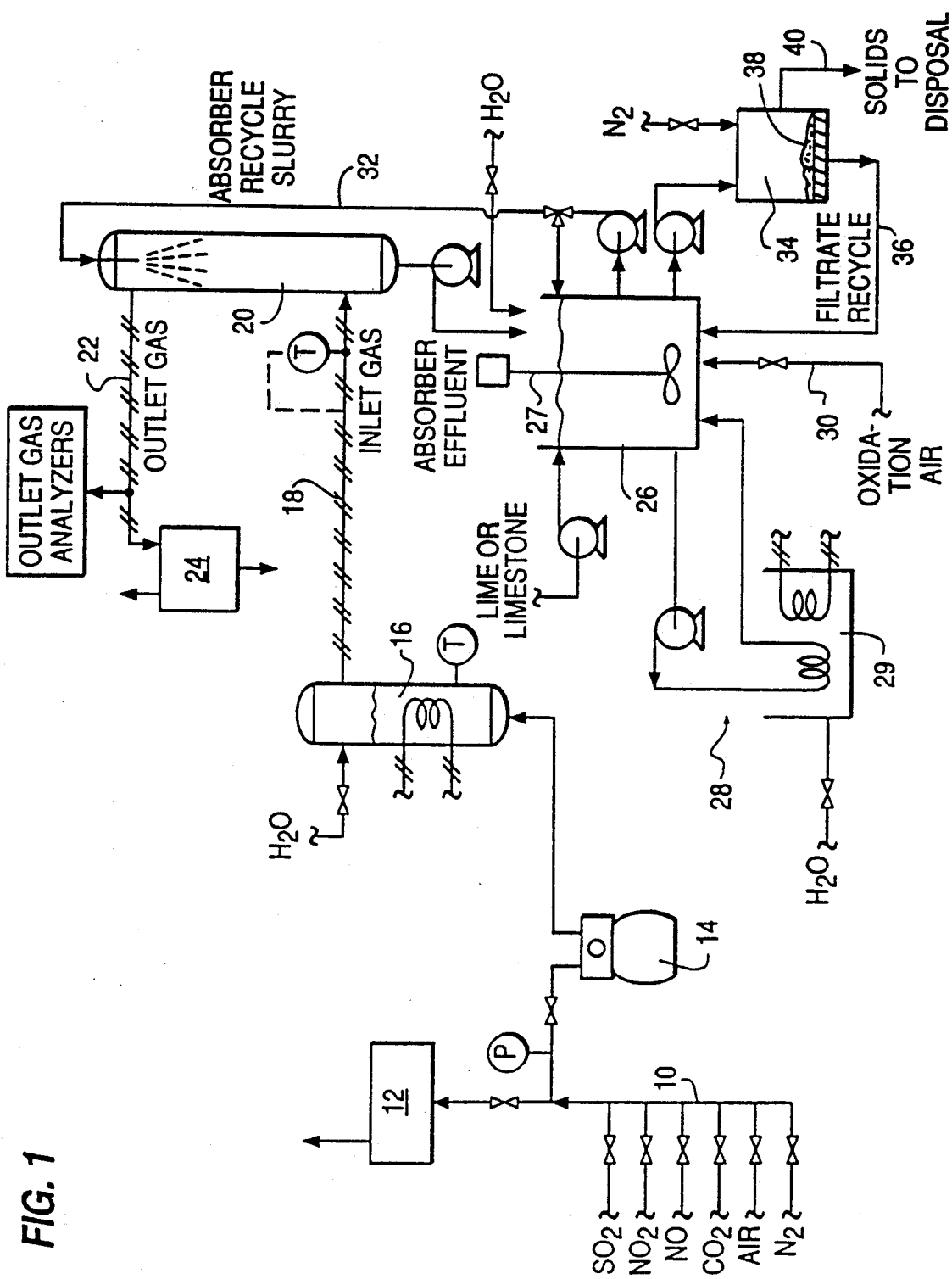
FIG. 1 illustrates schematically a bench scale wet calcium-based flue gas desulfurization system.

Referring to the drawings, FIG. 1 illustrates, schematically, a 5-acfm bench scale FGD system which has been used to demonstrate the effectiveness of the present method in controlling the crystal growth characteristics of FGD byproduct solids. Although the present invention is described herein primarily with respect to the performance of this process on bench scale-sized apparatus, the process may be performed equally efficiently and effectively on full scale FGD apparatus equivalent to that described herein.

Synthetic flue gas containing $SO_2$ is produced by an inlet gas manifold system 10. A portion of the inlet gas is analyzed by inlet gas analyzers 12. The remainder of the $SO_2$-containing flue gas is directed to a dry gas meter 14 and then to a water saturator and heater column 16. The flue gas, which is saturated at a temperature of approximately 50° C., then flows through a heated gas line 18 where it is heated to 190° C. and to an absorber or scrubber 20, which may be a spray tower or bubbler. The scrubbed gas flows from the absorber 20 through a heated outlet gas line 22, to an outlet gas analyzer, to a knock-out vessel 24 and is vented or directed to a drain, as appropriate. Gas in the absorber is contacted by slurry from the reaction tank 26. Effluent from the absorber 20 and make-up water are directed into a reaction tank 26 equipped with a variable speed mixer 27 for agitation. A source of calcium, preferably lime or limestone is also added to the reaction tank to control pH. The contents of the reaction tank are heated in a reaction tank heater loop 28 which includes a heated water bath 29. Forced oxidation conditions are maintained in the reaction tank by providing a constant supply of oxidation air to the reaction tank through line 30. Slurry from the reaction tank is circulated to the absorber through line 32 and through the absorber back to the reaction tank where calcium sulfate solids precipitate to form a slurry. The reaction tank slurry is also drained from the reaction tank and directed through an in-line filter 34 to collect gypsum solids and control the solids concentration of the slurry. The filtrate is recycled through line 36 back to the reaction tank 26. The filtered gypsum solids 38 are then routed through line 40 and disposed of.

Gypsum crystals precipitated in FGD systems are typically columnar with aspect ratios of about 1:2:5, although these can vary considerably, depending on the growth conditions. The largest faces on the precipitated crystals represent the slowest growing faces. If the rates of growth on the faces on the ends of the crystal are reduced relative to the growth on the larger side faces, the crystal will become more regular or equant in shape. The precipitation of a salt from an aqueous solution can proceed by two processes, namely nucleation and crystal growth. A necessary criterion for precipitation to occur is that the solution be supersaturated with respect to the compound of interest. The degree of saturation or relative saturation (RS) of a solution towards a specific compound, such as calcium sulfate dihydrate for example, can be defined as:

$$RS = (a_{Ca^{+2}} \cdot a_{SO_4^{-2}} \cdot a_{H_2O}) / K_{sp}(T)$$

where: $a_i$ is the activity of species, i. The activity of a dissolved species is a complex function of its concentration and all other dissolved species.

Figure 2:
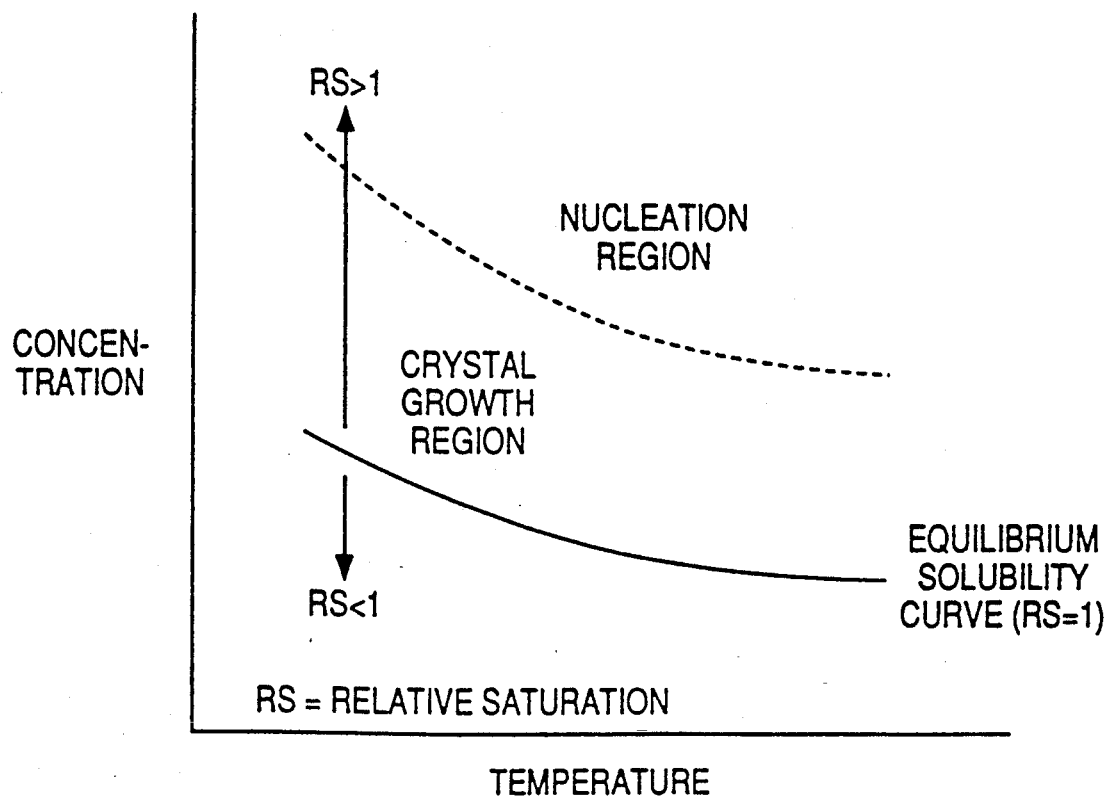
FIG. 2 represents graphically the relationship between relative saturation and solution concentration as a function of temperature for a gypsum crystal system.

FIG. 2 represents, graphically, the relationship of relative saturation and solution concentration as a function of temperature, and depicts the crystal growth and nucleation regions. A liquid whose composition falls below the solid line in FIG. 2 is subsaturated. In the area above the solid line, the solution is supersaturated and precipitation is possible. In the area bounded by the solid and dotted lines in FIG. 2, precipitation can be controlled by seed crystal growth. An increase in supersaturation, however, will reach a level at which precipitation will occur both by crystal growth mechanism and nucleation. In the FGD system, the conditions favorable to the creation of new gypsum crystal nuclei also tend to produce scale and reduce average particle size. If no seed crystals are present, the gypsum will precipitate at relatively high supersaturation levels as primary nucleation. However, the presence of seed crystals produces secondary or collision nucleation at substantially lower supersaturation levels. Secondary nucleation will occur in a seeded crystallizer at all relative saturations greater than 1.0. In the absence of chemical growth modifiers, the control of the amount of solids in the recirculation loop and the degree of crystal breakage or attrition are the primary variables for controlling crystal sizes.

The present invention is premised on chemically modifying the precipitation or crystal formation of gypsum to change its crystal growth rate and nucleation characteristics to favor the formation of large crystals. The addition level of the crystal modifiers is controlled to significantly reduce nucleation without completely inhibiting crystal growth. As a result, the formation of small crystals is reduced, and the shape of the crystals is modified. Typically, precipitation inhibition by crystal modifiers occurs by one and/or two mechanisms. In one case, the chemical can adsorb to the surfaces of growing crystals and thereby reduce the overall growth rate. The additive can also interact with the molecular cluster of the substance in solution and prevent the formation of stable microcrystalline nuclei. In general, the inhibition of nucleation will result in the formation of larger crystals.

The ability of additives to alter the shape of precipitated crystals is due to the preferential adsorption on certain faces of the crystal. Most often, adsorbed species tend to inhibit the rate of growth on the affected faces. This process tends to cause these faces to become larger relative to the unaffected faces. Depending upon the degree of chemical interactions, these adsorbed species may be displaced during subsequent growth or partially entrapped into the crystal.

Gypsum crystal growth can be modified by carboxylic acids, polyacrylates, sulfonates, organic phosphates, polyphosphates and organophosphonates. The crystal growth modifiers preferred for use in the process of the present invention include organophosphonates, organic phosphates and polyphosphates. Preferred organophosphonates, which are shown in Table I below, are ATMP: aminotri(methylene phosphonic acid), HEDP: hydroxyethylidene-1,1-diphosphonic acid, HTMP: hexamethylenediamine tetra(methylene phosphonic acid) and DTPMP: diethylenetriamine penta(methylene phosphonic acid). A preferred polyphoshate is PPA: polyphosphoric acid.

TABLE I

Polyphosphoric Acid (PPA)

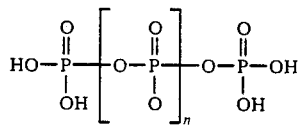

ATMP (MW = 299)

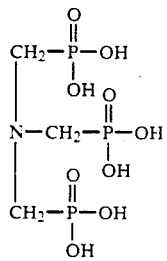

HEDP (MW = 206)

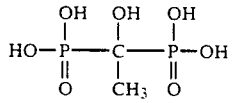

HTMP (MW = 721)

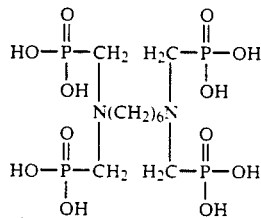

DTPMP (MW = 573)

TABLE I-continued

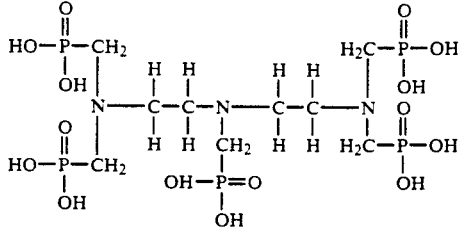

Organic phosphonates differ from polyphosphates and organic phosphates in that their structure includes extremely stable carbon-phosphorous bonds that are not readily subject to chemical degradation. In addition, phosphonates are biodegradable. Consequently, these compounds are especially suited to the FGD process environment.

The foregoing crystal modifiers have been found to be very effective in influencing gypsum crystal size in a flue gas desulfurization system at relatively low addition levels of less than 200 ppm. The most effective addition level will depend to a large extent on the specific chemical crystal modifier used. However, addition levels of 20 ppm and less have been found to be effective.

Although polyacrylates are effective crystal growth modifiers, the use of these compounds either alone in combination with the organophosphonates or other crystal modifiers is not recommended. Gypsum crystal growth may be inhibited too severely by the inclusion of a polyacrylate with the preferred crystal habit modifiers.

Figure 3A:
FIG. 3 is an electron micrograph of FGD byproduct gypsum crystals to which no crystal modifier has been added.
Figure 3B:
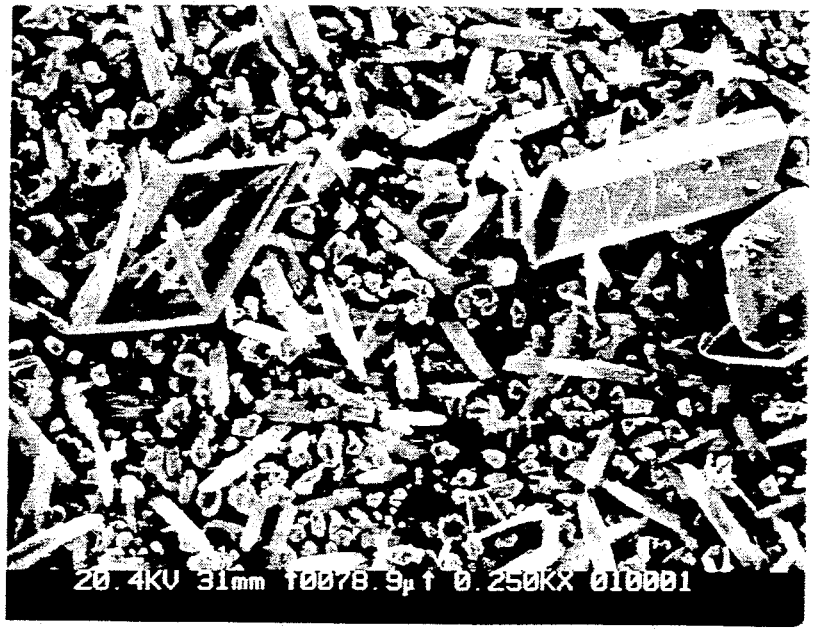
Figure 3C:
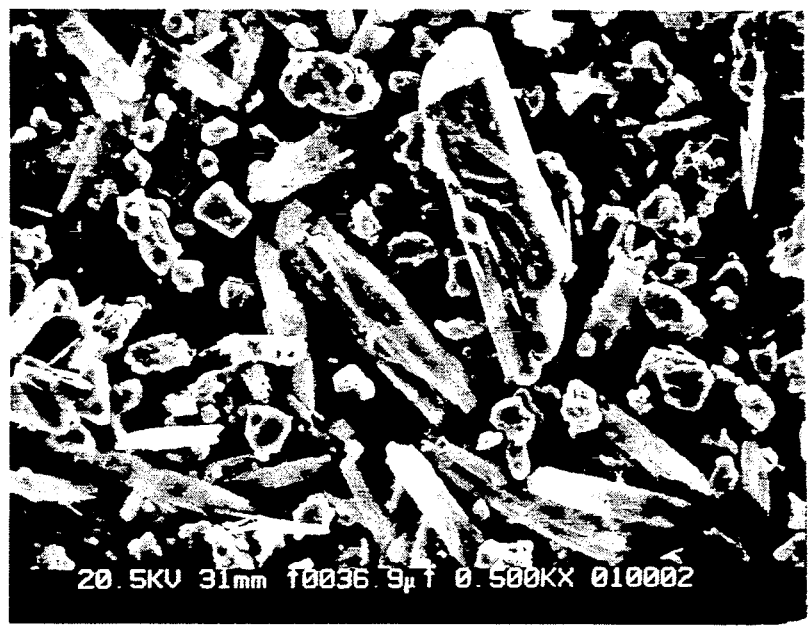
Figure 4A:
FIG. 4 is an electron micrograph of FGD byproduct gypsum crystals modified by ATMP.
Figure 4B:
Figure 4C:
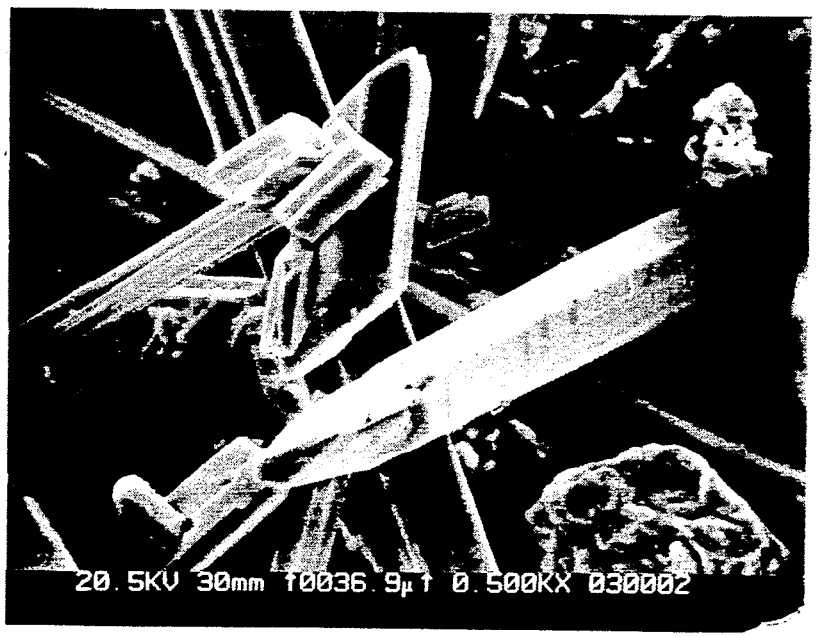
Figure 5A:
FIG. 5 is an electron micrograph of FGD byproduct gypsum crystals modified by PPA.
Figure 5B:
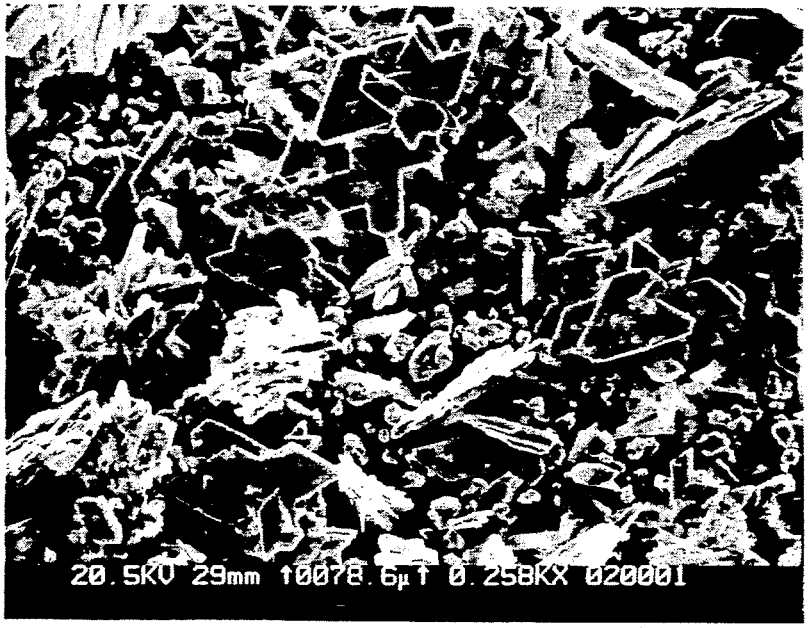
Figure 5C:

FIGS. 3, 4 and 5 illustrate, respectively, scanning electron micrographs of unmodified (base case), ATMP-modified and PPA-modified gypsum crystals. These crystals were produced in the FGD system shown in FIG. 1 under forced oxidation conditions with air sparging in the reaction tank 26. The system was operated to maintain stable operating conditions for pH, temperature, slurry solids concentrations, liquid-to-gas ratio and additive concentration. The pH was maintained by adding limestone slurry to the reaction tank according to a pH feedback control. The slurry solids was held constant by filtering a slipstream of slurry at a rate of about 1.2 grams of solids per minute. Additive level was 20 ppm. The crystals produced under these conditions can be characterized as monoclinic crystals with columnar habits. Table II summarizes the experimental variables and operating conditions under which these crystals were produced.

TABLE II

| Test Description | Temp (F.) | pH | Gas Flow (acfm) | Slurry Flow (gpm) | SO2 Removal (%) | Solids Prod. Rate (g/min) | Limestone Feed Rate (g/min) | Solids Conc. (Wt. %) | [SO3] (mM/L) | Inlet SO2 (gpm) | Sulfite oxid (%) | Solids Res. Time (Min) |
| --- | --- | --- | --- | --- | --- | --- | --- | --- | --- | --- | --- | --- |
| Base Case - Forced Oxidation | 122 | 5.2 | 5.1 | 0.5 | 62 | 1.35 | 1.04 | 6.1 | 1.1 | 2000 | 95 | 361 |
| 20 ppm PPA - Forced Oxidation | 122 | 5.4 | 5.2 | 0.5 | 59 | 1.28 | 1.13 | 6.2 | 1.1 | 2100 | 95 | 386 |
| 20 ppm ATMP - Forced Oxidation | 122 | 5.4 | 5.1 | 0.5 | 54 | 1.30 | 1.08 | 6.5 | 1.1 | 2300 | 100 | 400 |

The dramatic effect of the ATMP on the size and shape of the crystals is clearly evident in these micrographs. The crystals grown with ATMP are significantly longer, thicker, and bulkier than the base case crystals. In addition, there appears to be considerably less fine material. The 20 ppm PPA was also effective in increasing the size and thickness of the gypsum crystals, although not to the same extent as ATMP.

Tests were performed to evaluate the settling properties of the solids. Experience has shown that these tests are very sensitive to subtle differences in the physical properties of solids which, quite often, cannot be observed in photomicrographs. Settling test results are reported as thickener unit area required to achieve a specified underflow concentration. Properties which tend to affect the settling rate of a solid include size, shape, and the amount of finer-sized material. The results of the settling tests are summarized in Table III below. These results are consistent with the photomicrographs. The ATMP-modified crystals, in particular, show a significant increase in settling rate as a result of the larger and thicker crystals.

TABLE III

| Test Description | Unit Area (ft 2/t * d) | Underflow Solids Conc. (Weight %) |
| --- | --- | --- |
| Base Case - Forced Oxidation | 11.7 | 15 |
| 20 ppm PPA - Forced Oxidation | 7.7 | 15 |
| 20 ppm ATMP - Forced Oxidation | 0.45 | 15 |

Figure 6:
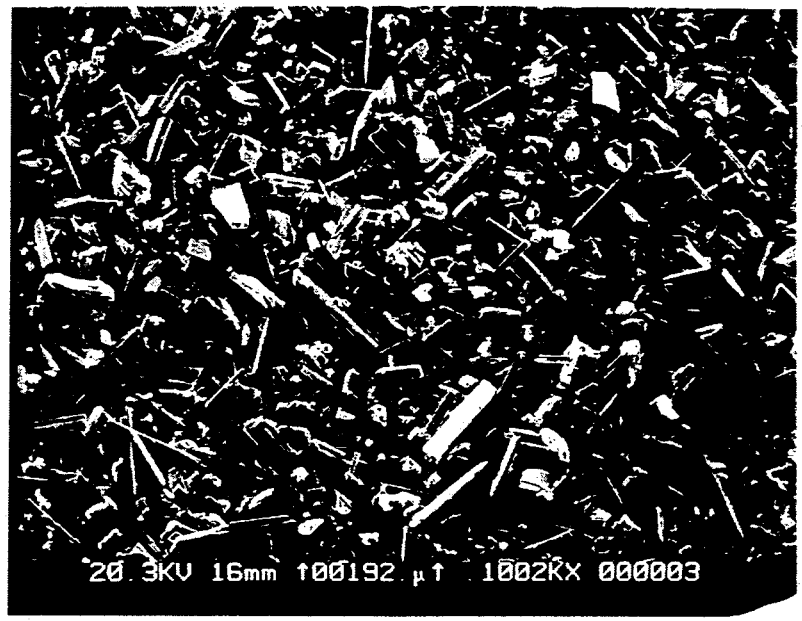
FIG. 6 is an electron micrograph of unmodified gypsum crystals.
Figure 7:
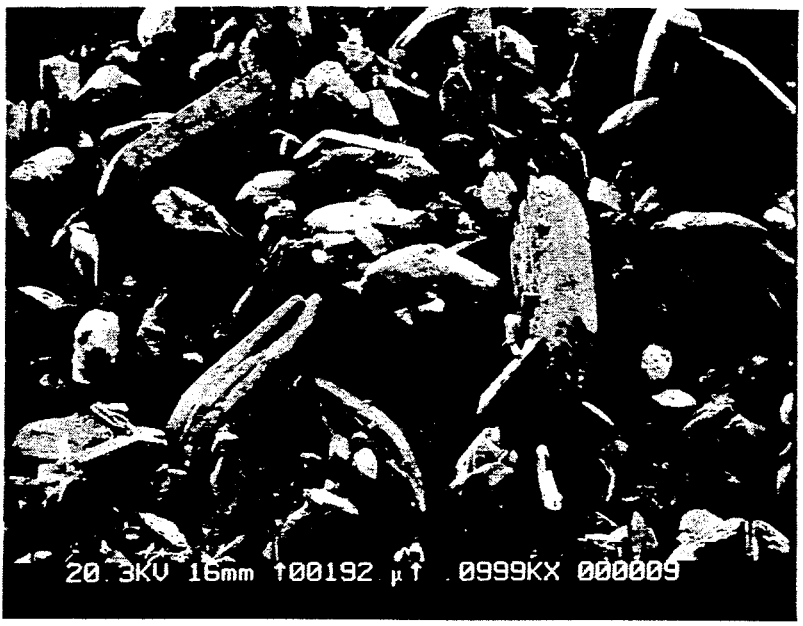
FIG. 7 is an electron micrograph of gypsum crystals modified by 10 ppm PPA.
Figure 8:
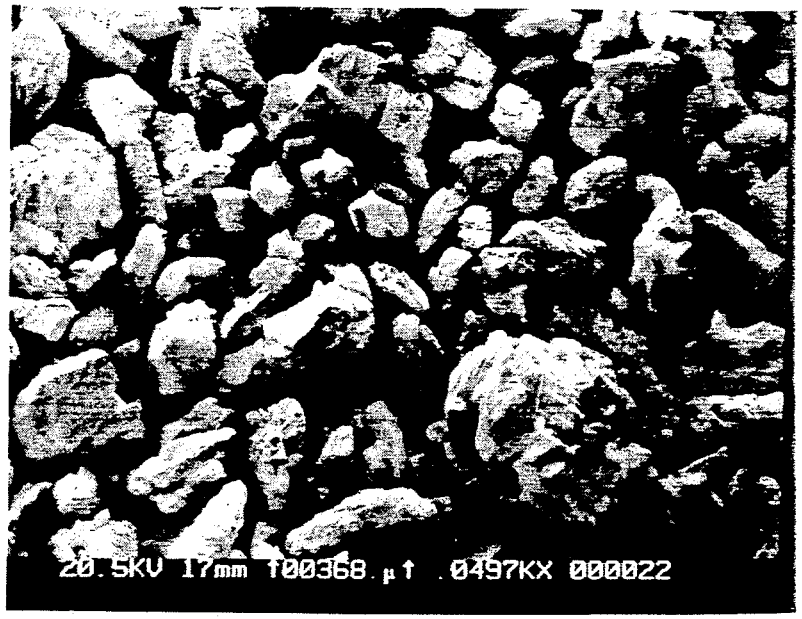
FIG. 8 is an electron micrograph of gypsum crystals modified by 10 ppm ATMP.
Figure 9:
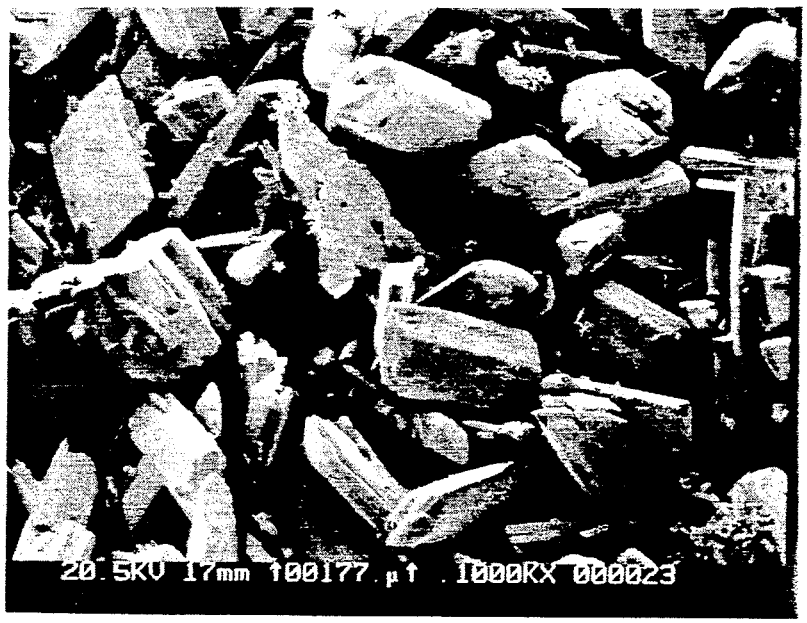
FIG. 9 is an electron micrograph of gypsum crystals modified by 10 ppm HEDP.
Figure 10:
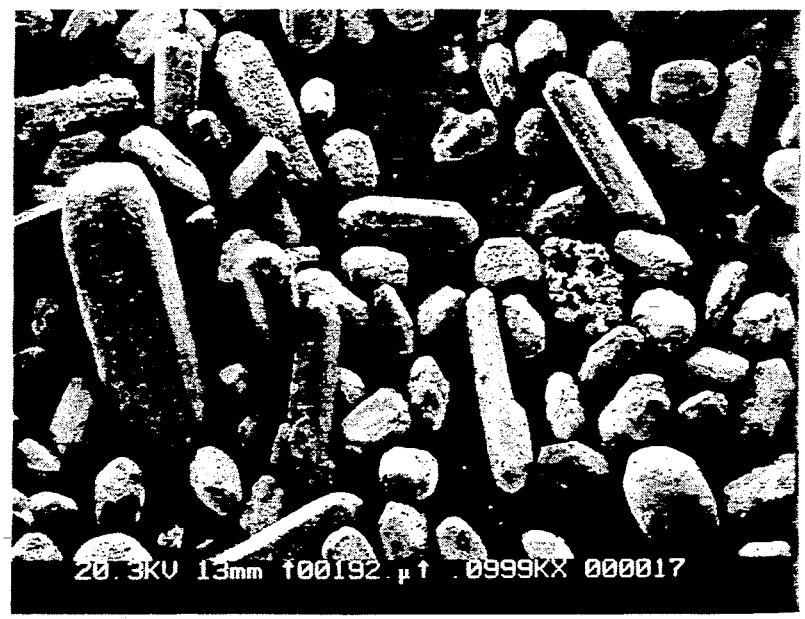
FIG. 10 is an electron micrograph of gypsum crystals modified by 10 ppm DTPMP.
Figure 11:
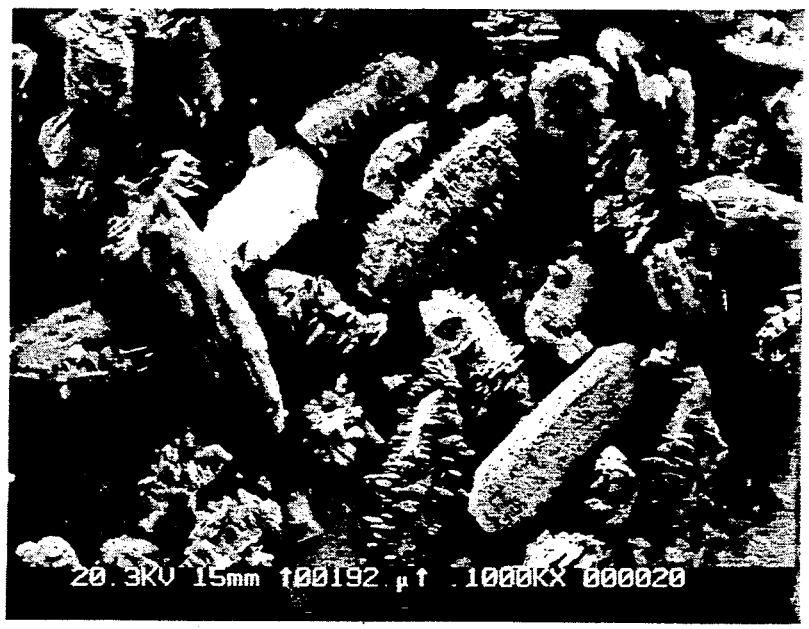
FIG. 11 is an electron micrograph of gypsum crystals modified by 10 ppm HTMP.

The effect of the preferred crystal modifier additives on the size, shape and habit of gypsum crystals precipitated by the FGD system shown in FIG. 1 was evaluated. The test apparatus used for this evaluation employed a mixed-product removal reactor configured to ensure thorough mixing of the feed solutions and product solids. The solids in the reactor were allowed to reach a steady state. At that point a small amount of gypsum seed crystals from a flue gas desulfurization system was introduced. A selected crystal modifier additive was introduced along with sodium sulfate and calcium, and the effect of the crystal modifier on size, shape and habit of the precipitated crystals was evaluated. The results of the tests conducted are summarized in Table IV below. Five different crystal modifiers at addition levels of 20 ppm or less were evaluated. All of the tests were conducted at a temperature of 50° C. and a pH of 5.5.

strate that all of the additives produced gypsum crystals that were larger, thicker and bulkier than the Base Case crystals. Crystals approaching 400 to 500 microns were produced. All of the crystals except those produced by PPA were more consistent in size and shape than the Base Case crystals. In addition, the very small crystals or crystal pieces shown clearly in FIG. 6 are absent from the gypsum crystals grown in the presence of the organophosphonates. ATMP, in particular, at 20 ppm addition level was very effective in increasing the size and thickness and improving settling properties of the precipitating gypsum crystals.

The improvement in settling and dewatering properties produced by the present invention could eliminate the need for thickeners and allow the use of hydrocyclones, which would substantially reduce the costs of the process. Moreover, because smaller secondary dewatering devices such as filters and centrifuges can be used by the present process, additional savings can be achieved.

The effectiveness of the present process in producing large crystals may require the addition of a particle grinding loop to replenish crystals removed in the blowdown from the FGD system. In addition, the particle grinding loop may be used alone or in connection with the crystal modifier to provide precise control of crystal size.

The present process has been described with respect to specific chemical crystal modifiers. However, it is contemplated that any gypsum crystal modifier which inhibits nucleation rates to a greater extent than crystal growth rates and is stable in the scrubber environment can be employed, as well.

INDUSTRIAL APPLICABILITY

The method of the present invention will find its primary application in modifying gypsum crystal growth in FGD systems employing wet calcium-based technology. However, this method may be employed in any gypsum crystal-producing process in which it is desired to control gypsum crystal growth, size and habit.

We claim:

1. A method for modifying calcium sulfate crystals produced as byproduct solids in a wet calcium-based flue gas desulfurization process conducted under forced

TABLE IV

| Test Description | (u) Ionic Strength | (min) Residence Time | (mM/gmin) Gypsum Precip Rate | Test R.S. | Gypsum Crystal Habit |
| --- | --- | --- | --- | --- | --- |
| Base Case | 0.17 | 22.6 | 0.44 | 1.77 | Lamellar |
| 10 ppm ATMP | 0.36 | 26.2 | 0.27 | 5.06 | Columnar/Agglomerate |
| 20 ppm ATMP | 0.38 | 22.2 | 0.37 | 4.83 | Columnar/Agglomerate |
| 5 ppm DTPMP | 0.36 | 25.7 | 0.82 | 4.96 | Agglomerate |
| 10 ppm DTPMP | 0.41 | 26.0 | 0.73 | 5.72 | Agglomerate |
| 20 ppm DTPMP | 0.51 | 21.8 | 0.91 | 7.03 | Lamellar/Agglomerate |
| 10 ppm HEDP | 0.22 | 26.3 | 0.34 | 2.43 | Columnar/Agglomerate |
| 20 ppm HEDP | 0.27 | 21.2 | 0.41 | 2.41 | Columnar/Agglomerate |
| 10 ppm HTMP | 0.52 | 25.2 | 0.24 | 7.23 | Agglomerate |
| 20 ppm HTMP | 0.61 | 24.8 | 0.91 | 8.80 | Agglomerate |
| 10 ppm PPA | 0.28 | 22.2 | 0.60 | 3.59 | Equant |
| 20 ppm PPA | 0.40 | 22.0 | 0.35 | 5.32 | Lamellar/Agglomerate |

FIG. 6 is a scanning electron micrograph of precipitated gypsum crystals without the addition of a crystal modifier, the "Base Case" in Table III. FIGS. 7 to 11 are scanning electron micrographs of gypsum crystals precipitated in the presence of the additives listed in Table IV above. These micrographs clearly demonoxidation conditions favoring the production of calcium sulfate over calcium sulfite solids to produce substantially regularly shaped calcium sulfate crystals greater than 200 microns in size, consisting essentially of contacting a sulfur oxide-containing gas with calcium to produce calcium sulfate solids; adding 5-200 ppm of a crystal growth habit modifier selected from the group consisting of polyphosphates, organic phosphates and organophosphonates to said calcium sulfate solids; and recovering substantially regularly shaped calcium sulfate crystals greater than 200 microns in size.

2. The method for modifying calcium sulfate flue gas desulfurization byproduct solids crystals described in claim 1, wherein said crystal growth habit modifier is an organophosphonate, and less than 100 ppm of said organophosphonate is added to said calcium sulfate byproduct solids.

3. The method for modifying calcium sulfate flue gas desulfurization byproduct solids crystals described in claim 2, wherein said organophosphonate is selected from the group consisting of aminotri(methylene phosphonic acid), hydroxyethylidene-1, 1-diphosphonic acid, hexamethylenediamine tetra(methylene phosphonic acid) and diethylenetriamine penta(methylene phosphonic acid).

4. The method for modifying calcium sulfate byproduct solids crystals described in claim 1, wherein 5-20 ppm of a polyphosphate or an organophosphonate is added to said byproduct solids.

5. The method for modifying calcium sulfate flue gas desulfurization byproduct solids crystals described in claim 3, wherein 20 ppm aminotri(methylene phosphonic acid) is added to said calcium sulfate byproduct solids.

6. A method for modifying gypsum crystals produced as byproduct solids in a flue gas desulfurization process conducted under conditions producing the substantially complete oxidation of calcium sulfite to calcium sulfate to form substantially regularly shaped gypsum crystals greater than 200 microns in size, consisting essentially of contacting a sulfur oxide-containing gas with calcium to produce gypsum solids; adding 5-100 ppm of an organophosphonate selected from the group consisting of aminotri (methylene phosphonic acid), hydroxyethylidene-1, 1-diphosphonic acid, hexamethylenediamine tetra(methylene phosphonic acid), and diethylenetriamine penta (methylene phosphonic acid) to said gypsum solids; and recovering substantially regularly shaped gypsum solids greater than 200 microns in size.

7. The method for modifying gypsum crystals described in claim 6, wherein 20 ppm of aminotri (methylene phosphonic acid) is added to said gypsum solids.

8. The method for modifying gypsum crystals described in claim 6, wherein 5-10 ppm of said organophosphonate is added to said gypsum solids.

9. The method for modifying gypsum crystals described in claim 6, wherein said regularly-shaped crystals are about 400 to 500 microns in size and exhibit a columnar and agglomerate crystal habit.

10. The method for modifying gypsum crystals described in claim 6, wherein the flue gas desulfurization process includes a particle grinding step to replenish removed crystals and to provide more precise control of crystal size.

* * * * *